(No Model.)
P. W. PURSLEY.
BRAKE FOR HAY FRAMES.
No. 534,081. Patented Feb. 12, 1895.
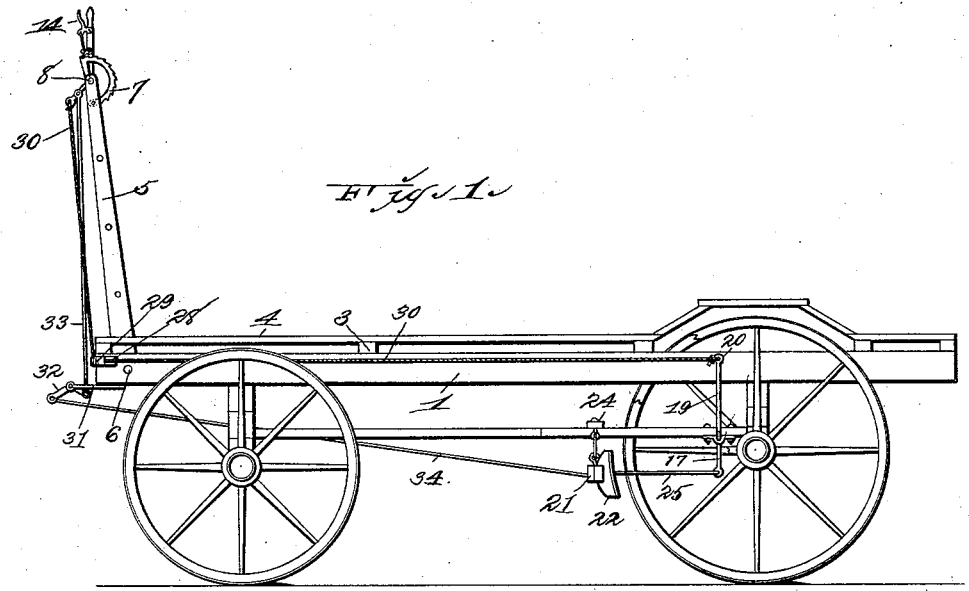
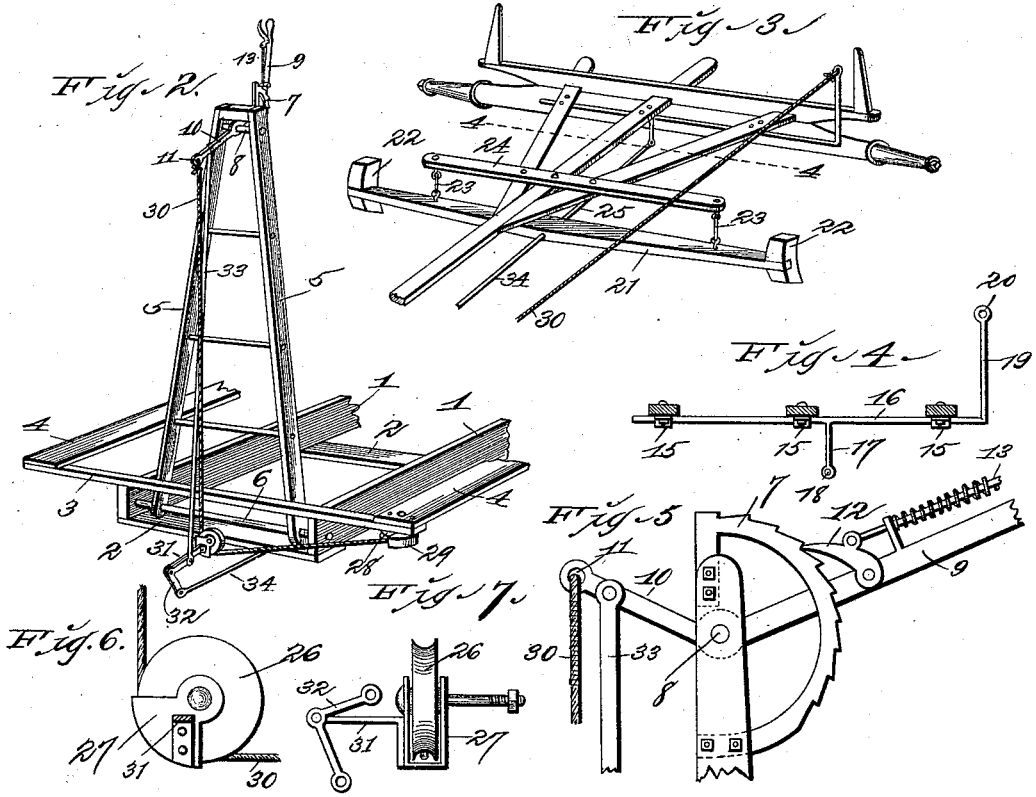

United States Patent Office.

PRESTON W. PURSLEY, OF GOOCH'S MILL, MISSOURI.

BRAKE FOR HAY-FRAMES.

SPECIFICATION forming part of Letters Patent No. 534,081, dated February 12, 1895.

Application filed November 6, 1894. Serial No. 523,102. (No model.)

*To all whom it may concern:*

Be it known that I, PRESTON W. PURSLEY, of the city of Gooch's Mill, Cooper county, State of Missouri, have invented certain new and useful Improvements in Brakes for Hay-Frames, of which the following is a full, clear, and exact description, reference being had to the accompanying drawings, forming a part hereof.

My invention relates to a brake that is especially applicable for use upon hay frames, although a brake of this construction may be used advantageously upon any ordinary wagon.

The object of my invention is to construct such a brake as that it will be positive in its action, easily operated, and the handle within easy reach of the driver of the wagon when a load of hay is upon the hay frame, said brake to possess superior advantages in point of simplicity, durability and general efficiency.

To the above purposes, my invention consists in certain novel features of construction, combination and arrangement of parts, hereinafter described and claimed.

Referring to the drawings: Figure 1 is a side elevation of a hay frame, the same having my brake applied thereto. Fig. 2 is a view in perspective of the front portion of a hay frame and showing the arrangement of the various parts of the brake as applied thereto. Fig. 3 is a view in perspective of the rear axle of a hay wagon, also the brake-beam and the attachment to said brake-beam. Fig. 4 is a horizontal sectional view taken approximately on the indicated line 4—4 of Fig. 3. Fig. 5 is a side elevation of the upper end of the ladder and showing the hand-lever and toothed-segment mounted thereon. Fig. 6 is a side elevation of one of the grooved-wheels or pulleys of which I make use in carrying out my invention. Fig. 7 is an edge elevation thereof.

Referring by numerals to the accompanying drawings, 1, 1 indicate the side timbers of an ordinary hay frame, the same being held together by means of cross timbers 2 and having mounted on their top edges cross-pieces 3 that extend beyond the side timbers 1 and have mounted thereon the ordinary sideboards 4. The ladder 5 is mounted upon a shaft 6 that extends from one side timber to the other, and has rigidly fixed to one of its upright timbers at the upper end a segmental toothed-rack 7.

Mounted upon a shaft 8 that is fixed in the upper ends of the upright timbers of the ladder 5 is a hand lever 9, the same being provided with an extension 10 in which is formed an aperture 11. The lever 9 is provided with an ordinary pawl 12 adapted to engage the teeth of the segment 7, said pawl 12 being operated by means of a spring-actuated rod 13 and tripping handle 14 that is pivoted to the upper end of the hand-lever 9.

Mounted in bearings 15 on the under side of the reach adjacent the rear axle is a rock-shaft 16, the same being provided at a point near its center with a downwardly pending arm 17 at the lower end of which is an eye 18. The outer right hand end of this rock-shaft 16 is bent upwardly at right angles to the main body portion, said upwardly bent portion being designated by the numeral 19 and having in its upper end an eye 20.

The brake-beam 21 is provided in the usual manner at its outer ends with the brake-shoes 22. This brake-beam 21 is hung to swing free beneath the reach of the wagon by means of connecting-rods 23, the same being connected to the outer ends of a cross-bar 24 that is rigidly secured to the top of the reach. A rod 25 connects the central portion of the brake-beam 21 with the eye 18 on the downwardly pending arms 17 of the rock-shaft 16. Bolted to the front one of the cross-timbers 2 is a grooved-wheel or pulley 26, the same being provided with a segmental casing 27. To the under side of the outer end of the front cross-piece 3 is mounted a grooved-wheel or pulley 28, the same being identical with the pulley 26 and provided with a segmental casing 29.

A rope or wire cable 30 is fixed at one end to the aperture 11 in the arm 10 of the hand-lever 9, and extends from thence downwardly around the pulley 26, thence to and around the pulley 28, and from thence rearwardly to the eye 20 in the upwardly bent portion 19 of the rock-shaft 16.

Bolted and extending at right angles to the casing 27 surrounding the pulley 26 is an arm 31, to the outer end of which is pivoted a bell-crank 32. Pivoted to the outer end of one arm of this bell-crank 32 is a vertical rod 33, the upper end of which is pivoted to the arm 10 of the hand lever 9. To the other end of the bell-crank 32 is pivoted the forward end of a horizontal rod 34, the rear end of which is fixed to the central portion of the brake-beam 21.

The details of construction as I have described them may be varied without departing from the true spirit of my invention.

The operation is as follows: When it is desired to throw the brake-shoes into engagement with the rear wheels, the operator grasps the upper end of the hand lever 9, together with the tripping handle 14 and pulls the same rearwardly and downwardly. This necessarily brings the portion 10 of said lever 9 into the position as shown in Fig. 5, which draws the rope or wire cable 30 forward, which in turn partially rotates the rock-shaft 16, throwing the lower end of the downwardly pending portion 17 thereof rearwardly, which in turn draws the connecting-bar 25 rearwardly and brings the brake-shoes 22 into engagement with the rear wheels, thus accomplishing the desired result. With this same movement the vertical rod 33 is drawn upwardly and the bell-crank 32 so moved as to throw the horizontal rod 34 rearwardly, thus assisting in positioning the brake-shoes 22 against the peripheries of the rear wheels. When it is desired to release the brake, the operator presses upon the tripping-handle 14 which necessarily releases the pawl 12 from the teeth of the segmental rack 7. He then moves said hand lever 9 to the position as shown in Fig. 1. This necessarily lowers the vertical rod 33, turns the bell-crank 32 to its normal position, which in turn draws forward on the horizontal rod 34, which in turn draws the brake-beam 21 a slight distance forward, thus releasing the brake-shoes 22 thereof from the peripheries of the rear wheels. With this same movement the rock-shaft 16 reassumes its normal position, as the horizontal rod 25 is rigidly connected to the brake-beam 21. Thus it will be seen how I have constructed a brake for hay frames that is extremely simple and inexpensive in construction and positive in its action, said brake being easily operated while there is a load of hay upon the hay frame.

What I claim is—

1. In a brake for hay frames, a hand lever, a segmental rack mounted upon the upper end of the ladder, a rock-shaft mounted in bearings fixed to the under side of the reach, a rod connecting said rock-shaft and the brake-beam, a flexible connection from said rock-shaft to the end of the hand lever, a bell-crank rigidly mounted on the hay frame, a rod connecting one end of said bell-crank to the hand lever, and a rod connecting the other end of said bell-crank to the brake-beam.

2. In a brake for hay frames, a hand operating lever, a toothed segment fixed to the upper end of the ladder, a wire rope or cable fixed to the outer end of said hand operating lever and extending from thence around pulleys to one end of a rock-shaft mounted in bearings fixed to the under side of the reach, and rods extending from the brake-beam to the hand lever.

In testimony whereof I affix my signature in presence of two witnesses.

PRESTON W. PURSLEY.

Witnesses:
P. SHORE,
JNO. C. HIGDON.